United States Patent
Cheng

(10) Patent No.: US 9,172,403 B2
(45) Date of Patent: Oct. 27, 2015

(54) REDUCING PORT REQUIREMENT OF ANTENNA SWITCH IN MULTI-BAND ELECTRONIC APPARATUS

(71) Applicant: HTC Corporation, Taoyuan County (TW)

(72) Inventor: Shen-Hao Cheng, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 53 days.

(21) Appl. No.: 14/093,518

(22) Filed: Dec. 2, 2013

(65) Prior Publication Data

US 2015/0155890 A1 Jun. 4, 2015

(51) Int. Cl.
*H04B 1/44* (2006.01)
*H04B 1/00* (2006.01)
*H04W 88/06* (2009.01)

(52) U.S. Cl.
CPC ............. *H04B 1/0057* (2013.01); *H04W 88/06* (2013.01)

(58) Field of Classification Search
CPC ...... H04B 1/005; H04B 1/0057; H04B 1/406; H04B 1/006; H04B 1/48; H04B 7/0602; H04B 7/04
See application file for complete search history.

(56) References Cited

U.S. PATENT DOCUMENTS

| | | | |
|---|---|---|---|
| 7,251,459 B2 | 7/2007 | McFarland et al. | |
| 2003/0207668 A1* | 11/2003 | McFarland et al. | 455/3.01 |
| 2006/0121937 A1* | 6/2006 | Son | 455/553.1 |
| 2010/0287594 A1* | 11/2010 | Zhang | 725/62 |
| 2011/0274146 A1* | 11/2011 | Huang et al. | 375/219 |
| 2012/0257550 A1* | 10/2012 | Chin et al. | 370/280 |

OTHER PUBLICATIONS

"Office Action of Taiwan Counterpart Application", issued on Sep. 1, 2015, p1-p7, in which the listed reference was cited.

* cited by examiner

*Primary Examiner* — Golam Sorowar
(74) *Attorney, Agent, or Firm* — Jianq Chyun IP Office

(57) ABSTRACT

The invention provides electronic apparatus including an antenna, an antenna switch, at least one switch unit, and a transceiver. The antenna switch has N transceiving ports. The antenna switch selects one of the transceiving ports for transceiving signal with the antenna. The switch unit is coupled between the antenna switch and the transceiver. The transceiver has transmitting ports and receiving ports, and one of the transmitting ports is coupled to the switch unit, and one of the receiving ports is coupled to the switch unit. Wherein, the first end is connected to the fourth end of the switch unit and the third end is connected to the second end of the switch unit in a first status, and the first end is connected to the second end of the switch unit and the third end is connected to the fourth end of the switch unit in a second status.

10 Claims, 4 Drawing Sheets

REDUCING PORT REQUIREMENT OF ANTENNA SWITCH IN MULTI-BAND ELECTRONIC APPARATUS

BACKGROUND OF THE INVENTION

1. Field of Invention

The present invention generally relates to an electronic apparatus, and more particularly to an electronic apparatus with multiple band signal transmission scheme.

2. Description of Prior Art

Along with the rapid development of science and technology at the present, hand-held electronic apparatus (such as mobile phone, tablet computer, and notebook) are widespread used. For providing the hand-held electronic apparatus to receive multiple band signals, a transceiver and an antenna switch with multiple ports are necessary.

Referring to FIG. 1, FIG. 1 is a block diagram of an electronic apparatus with a duel band wireless transceiving apparatus. The electronic apparatus 100 includes a transceiver 110, an antenna switch 120, an antenna ANT and a plurality of filters SAW1-SAW4. In FIG. 1, the transceiver 110 has four ports and the antenna switch 120 also has four ports PR1-PR4. For example, when a first signal with a first time division (TD) band received or transmitted through the antenna switch 120, the antenna switch 120 can respectively receive and transmit the first signal through the ports PR1 and PT1. In detail, when the first signal is received by the antenna ANT, the antenna switch 120 transmits the first signal by the port RT1 to the filter SAW2, and the transceiver 110 receives the filtered first signal through the filter SAW2. When the first signal is transmitted out from the transceiver 110, the first signal is transmitted to the filter SAW1. The antenna switch 120 receives the filtered first signal from the filter SAW1 through the port PR1, and transmits the filtered first signal to the antenna ANT.

On the other hand, when a second signal with a second time division (TD) band received or transmitted through the antenna switch 120, the antenna switch 120 can respectively receive and transmit the second signal through the ports PR2 and PT2.

That is, for transceiving signal with dual band, four ports PR1-PR2 and PT1-PT2 of the antenna switch 120 are necessary, and four filters SAW1-SAW4 are necessary, too. Along the increasing of the number of the bands of the signal, a difficult of the circuit design of the electronic apparatus 100 is increased, and the prime cost thereof is increased correspondingly.

SUMMARY OF THE INVENTION

The present invention provides an electronic apparatus, and the electronic apparatus for reducing a port requirement of the antenna switch.

The electronic apparatus includes an antenna, an antenna switch, at least one switch unit, and a transceiver. The antenna switch has N transceiving ports. The antenna switch is coupled to the antenna and selects one of the transceiving ports for transceiving signal with the antenna. The switch unit has a first end, a second end, a third end and a fourth end. The first end of the switch unit is coupled to a first transceiving port of the transceiving ports, and the third end of the switch unit is coupled to a second transceiving port of the transceiving ports. The transceiver has M transmitting ports and M receiving ports, and one of the transmitting ports is coupled to the fourth end of the switch unit, and one of the receiving ports is coupled to the second end of the switch unit. Wherein, the first end is connected to the fourth end of the switch unit and the third end is connected to the second end of the switch unit when the antenna switch is in a first status, and the first end is connected to the second end of the switch unit and the third end is connected to the fourth end of the switch unit when the antenna switch is in a second status. M and N are positive integers.

In an embodiment of the disclosure, the electronic apparatus further includes at least two modems. One of the at least two modems is configured to generate a selecting signal to switch the antenna switch into one of the first status and the second status, wherein the modem is operated in a first communication band when the antenna switch is in the first status and operated in a second communication band different from the first communication band when the antenna switch is in the second status.

In an embodiment of the disclosure, wherein the first communication band and the second communication band are not substantially different from each other.

In an embodiment of the disclosure, the electronic apparatus further includes at least one first filter and at least one second filter. The first filter is coupled between the first end of the switch unit and the first transceiving port, and the second filter is coupled between the third end of the switch unit and the second transceiving port.

In an embodiment of the disclosure, wherein the first filter has a first passing band covering the first communication band, the second filter has a second passing band covering the second communication band, and the first passing band and the second passing band are different.

In an embodiment of the disclosure, the electronic apparatus further includes M power amplifiers. The M power amplifiers are respectively coupled to the M transmitting ports for amplifying signals transmitted from the M transmitting ports. Wherein, one of the M power amplifiers is coupled between one of the M transmitting port and the second end of the switch unit and has a bandwidth covering both the first communication band and the second communication band.

In an embodiment of the disclosure, the transmitting port which coupled to the second end of the switch unit includes a first sub-transmitting port and a second sub-transmitting port. The electronic apparatus further includes a first power amplifier, a second power amplifier and a selecting circuit. An input end of the first power amplifier is coupled to the first sub-transmitting port, an input end of the second power amplifier is coupled to the second sub-transmitting port, and the selecting circuit, coupled to output ends of the first power amplifier and the second power amplifier. The selecting circuit is further coupled to the second end of the switch unit, for selecting one of the output ends of the first and second power amplifiers to couple to the second end of the switch unit.

In an embodiment of the disclosure, a gain margin of the first power amplifier and a gain margin of the second power amplifier are different.

In an embodiment of the disclosure, the M transmitting ports and the M receiving ports are respectively used to transmitting and receiving signals with time division band.

In an embodiment of the disclosure, a part of the M transmitting ports and the M receiving ports are respectively used to transmitting and receiving time division synchronous code division multiple access (TD-SCDMA) signals, and another part of the M transmitting ports and the M receiving ports are respectively used to transmitting and receiving time division long term evolution (TD-LTE) signals.

In an embodiment of the disclosure, the transceiver further includes O transmitting ports and O receiving ports. The O transmitting ports and O receiving ports respectively transmit and receive signals with frequency division band, wherein, O is a positive integer.

In summary, the present disclosure provides at least one switch unit, and the switch unit is used to select signal transmitting path between the transceiver and the antenna switch. Accordingly, a number of ports of the antenna switch and a number of the filters can be reduced, and the circuit design of the electronic apparatus can be simplified.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
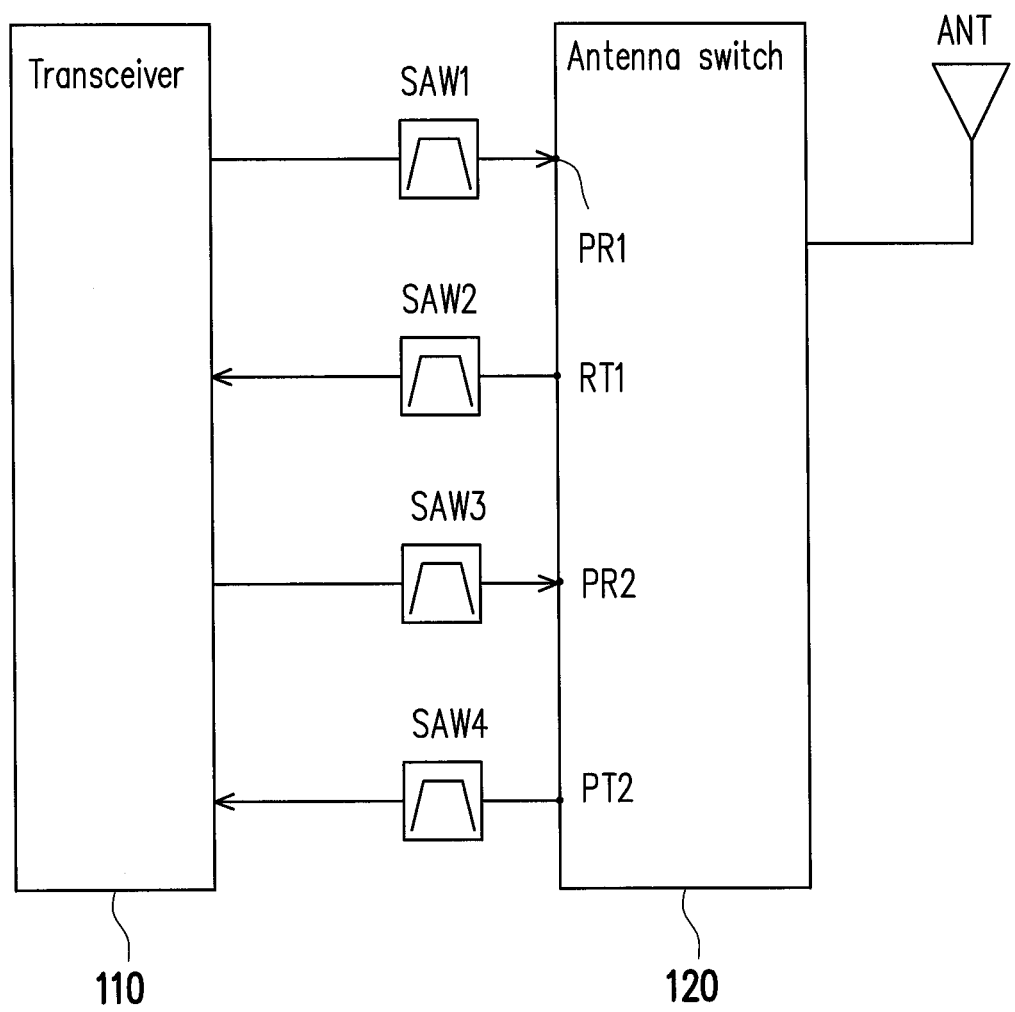
FIG. 1 is a block diagram of an electronic apparatus with a duel band wireless transceiving apparatus.

Reference will now be made in detail to the present preferred embodiment of the invention, examples of which are illustrated in the accompanying drawings. Wherever possible, the same reference numbers are used in the drawings and the description to refer to the same or like parts.

Figure 2A:
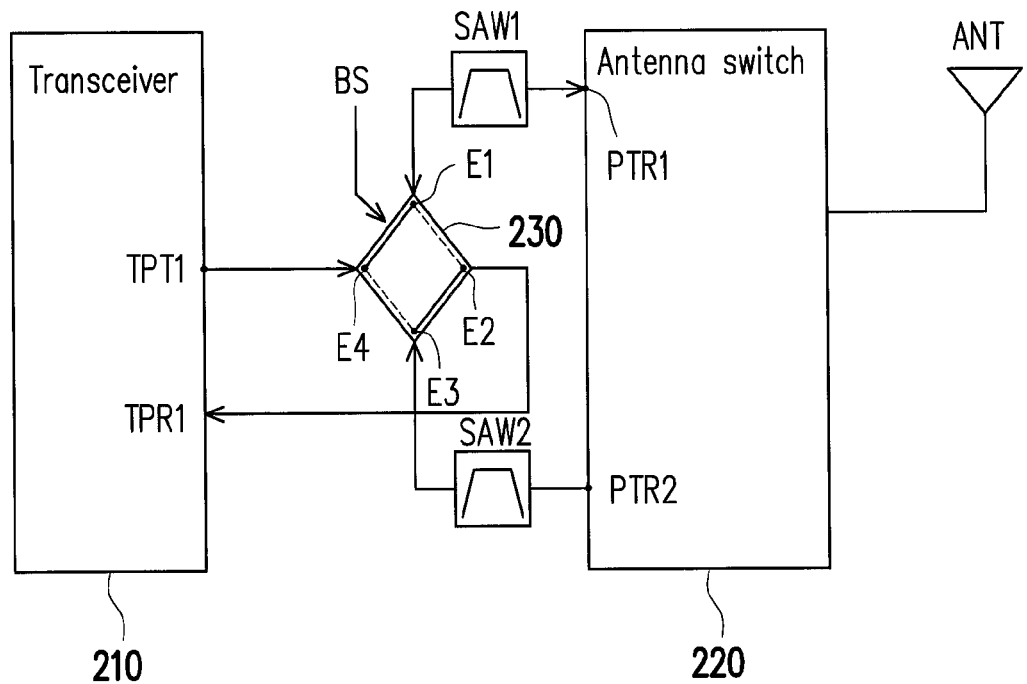
FIG. 2A is a block diagram of an electronic apparatus according to an embodiment of present disclosure.

Please referring to FIG. 2A, FIG. 2A is a block diagram of an electronic apparatus according to an embodiment of present disclosure. The electronic apparatus 200 includes a transceiver 210, an antenna switch 220, a switch unit 230, an antenna ANT and filters SAW1-SAW2. The antenna switch 220 is coupled to the antenna ANT, and the antenna switch 220 has transceiving ports PTR1 and PTR2. Herein, the transceiving ports PTR1 may be used to receive a first filtered signal from the filter SAW1, and the transceiving ports PTR1 may be used to transmit a first signal from the antenna ANT to the filter SAW. On the other hand, the transceiving ports PTR2 may be used to receive a second signal from the antenna ANT, and the transceiving ports PTR2 may be use to receive a second filtered signal from the filter SAW2. Furthermore, the antenna switch 220 may further have more transceiving ports, and the antenna switch 220 may select one of the transceiving ports for transceiving signal with the antenna ANT.

The transceiver 210 has a transmitting port TPT1 and a receiving port TPR1, and the transmitting port TPT1 and the receiving port TPR1 are coupled to the switch unit 230. Wherein, the transmitting port TPT1 transports a signal to the switch unit 230, and the receiving port TPR1 receives a signal from the switch unit 230. Furthermore, the transceiver 210 may have more transmitting ports and receiving ports for respectively transmitting and receiving a plurality of signals.

The switch unit 230 has four ends E1-E4, and the end E1 is coupled to the transceiving port PR1 of the antenna switch 220 through the filter SAW1, the end E2 is coupled to the receiving port TPR1 of the transceiver 210, the end E3 is coupled to the transceiving port PT1 of the antenna switch 220, and the end E4 is coupled to the transmitting port TPT1 of the transceiver 210. Moreover, when the switch unit 230 is in a first status, the end E1 of the switch unit 230 is coupled to the end E4 of the switch unit 230, and the end E2 of the switch unit 230 is coupled to the end E3 of the switch unit 230. On the other hand, in a second status, the end E1 of the switch unit 230 is coupled to the end E2 of the switch unit 230, and the end E3 of the switch unit 230 is coupled to the end E4 of the switch unit 230.

The switch unit 230 further receives a selecting signal BS for controlling the switch unit 230 is in the first status or the second status. The selecting signal BS may be sent from a modem of the electronic apparatus 200. The selecting signal BS is used to indicate the signal be transmitted or received by the electronic apparatus 200. For example, when the selecting signal BS is in a first logic status, the signal may be transmitted by the electronic apparatus 200, and when the selecting signal BS is in a second logic status, the signal may be received by the electronic apparatus 200.

The electronic apparatus 200 can transmit and receive the signal with two different bands, such as the time division long term evolution (TD-LTE) band and time division synchronous code division multiple access (TD-SCDMA) band. In FIG. 2A, the transceiving ports PTR1 may be used to transmit or receive the TD-LTE band signal, and the ransceiving ports PTR2 may be use to transmit or receive the TD-SCDMA band signal. That is, the filter SAW1 may be designed for the TD-LTE band signal, and the filter SAW2 may be designed for the TD-SCDMA band signal.

Figure 2B:
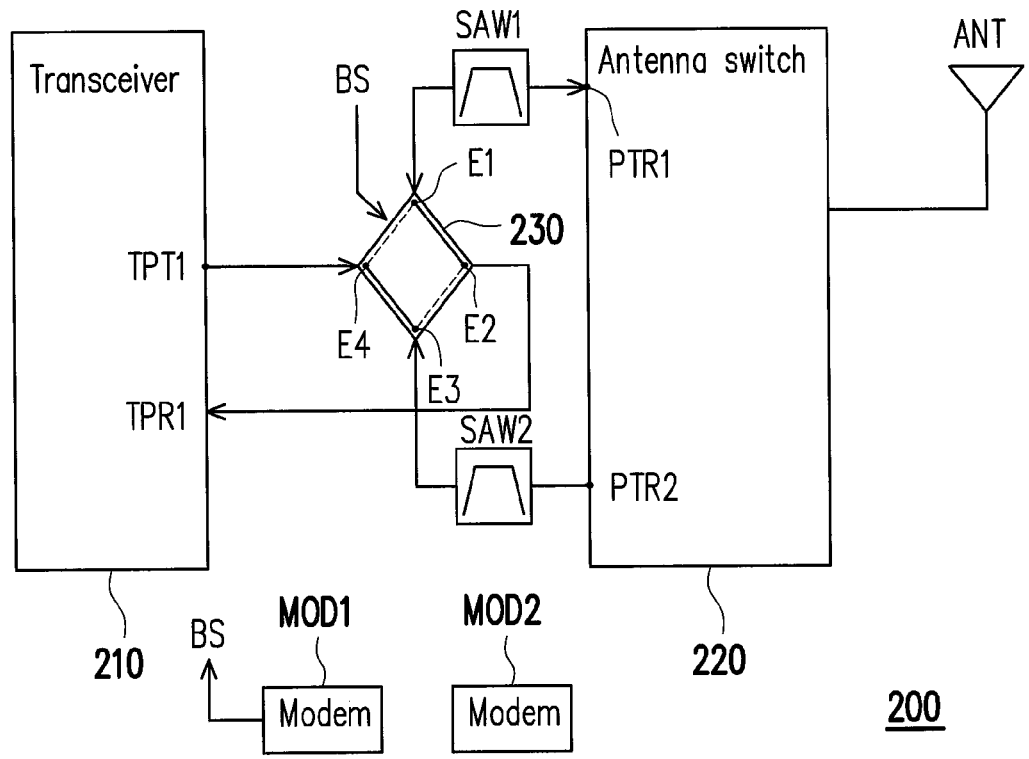
FIG. 2B is a block diagram of the electronic apparatus according to another embodiment of present disclosure.

About the detail operation of the electronic apparatus 200, please refer to FIG. 2A and FIG. 2B, wherein, FIG. 2B is a block diagram of the electronic apparatus according to another embodiment of present disclosure. When the electronic apparatus 200 determines to transmit or receive a first band signal, the antenna switch 220 may select the transceiving port PTR1 for transmit or receive the first band signal.

When the electronic apparatus 200 transmits the first band signal, the transceiver 210 transmits the first band signal to the switch unit 230 through the transmitting port TPT1. The end E4 of the switch unit 230 receives the first band signal, and the first band signal is transported to the filter SAW1 through end E1 of the switch unit 230 because of the end E4 and end E1 are connected to each other. The filter SAW1 filters the first band signal and transports a filtered first band signal to the antenna switch 220. Furthermore, the antenna switch 220 receives the filtered first band signal through the transceiving port PTR1, and sends the filtered first band signal to the antenna ANT.

On the other hand, when the electronic apparatus 200 receives the first and signal, please refer to FIG. 2B, the end E1 is coupled to the end E2 of the switch unit 230, and end E3 is coupled to the end E4 of the switch unit 230 according to the selecting signal BS. The first signal is received by the antenna ANT, and transported to the filter SAW1 through the transceiving port PTR1. Further, the first band signal is filtered by the filter SAW1, and a filtered first band signal is transported from the end E1 of the switch unit 230 to the end E2 of the switch unit 230, and the filtered first band signal is received by the transceiver 210 through the receiving port TPR1.

When the electronic apparatus 200 determines to transmit or receive a second band signal, the antenna switch 220 may select the transceiving port PTR2 for transmit or receive the first band signal. Please refer to FIG. 2B again, when the electronic apparatus 200 transmits the second band signal, the transceiver 210 transmits the second band signal to the switch unit 230 through the transmitting port TPT1. The end E4 of the switch unit 230 receives the second band signal, and the second band signal is transported to the filter SAW2 through end E3 of the switch unit 230 because of the end E4 and end E3 are connected to each other. The filter SAW2 filters the second band signal and transports a filtered second band signal to the antenna switch 220. Furthermore, the antenna switch 220 receives the filtered second band signal through the transceiving port PTR2, and sends the filtered second band signal to the antenna ANT.

On the other hand, when the electronic apparatus 200 receives the second band signal, please refer to FIG. 2A, the end E1 is coupled to the end E4 of the switch unit 230, and end E2 is coupled to the end E2 of the switch unit 230 according to the selecting signal BS. The second signal is received by the antenna ANT, and transported to the filter SAW2 through the transceiving port PTR2. Further, the second band signal is filtered by the filter SAW2, and a filtered second band signal is transported from the end E3 of the switch unit 230 to the end E4 of the switch unit 230, and the filtered second band signal is received by the transceiver 210 through the receiving port TPR1.

The selecting signal BS may be generated by one of at least two modems MOD1 and MOD2 of the electronic apparatus 200. In FIG. 2B, the selecting signal BS is generated by the modem. MOD1. The selecting signal BS is used to switch the antenna switch into one of the first status and the second status. Wherein, the modem MOD1 is operated in a first communication band when the antenna switch 220 is in the first status and operated in a second communication band different from the first communication band when the antenna switch 220 is in the second status. The first communication band and the second communication band are not substantially different from each other.

Besides, the filter SAW1 has a first passing band which covers the first communication band. The filter SAW2 has a second passing band which covers the second communication. Moreover, the first passing band and the second passing band may be different.

Please notice here, referring to FIG. 2A and FIG. 2B, the antenna switch 220 only need two transceiving ports for transmitting and receiving signals with two different band, and only two filters SAW1 and SAW2 are needed in the electronic apparatus 200. That is, by comparing to the electronic apparatus 100 in FIG. 1, a number of the hardware components of the electronic apparatus 200 is reduced, and the design difficulty and the cost of the electronic apparatus 200 can be reduced.

Figure 3:
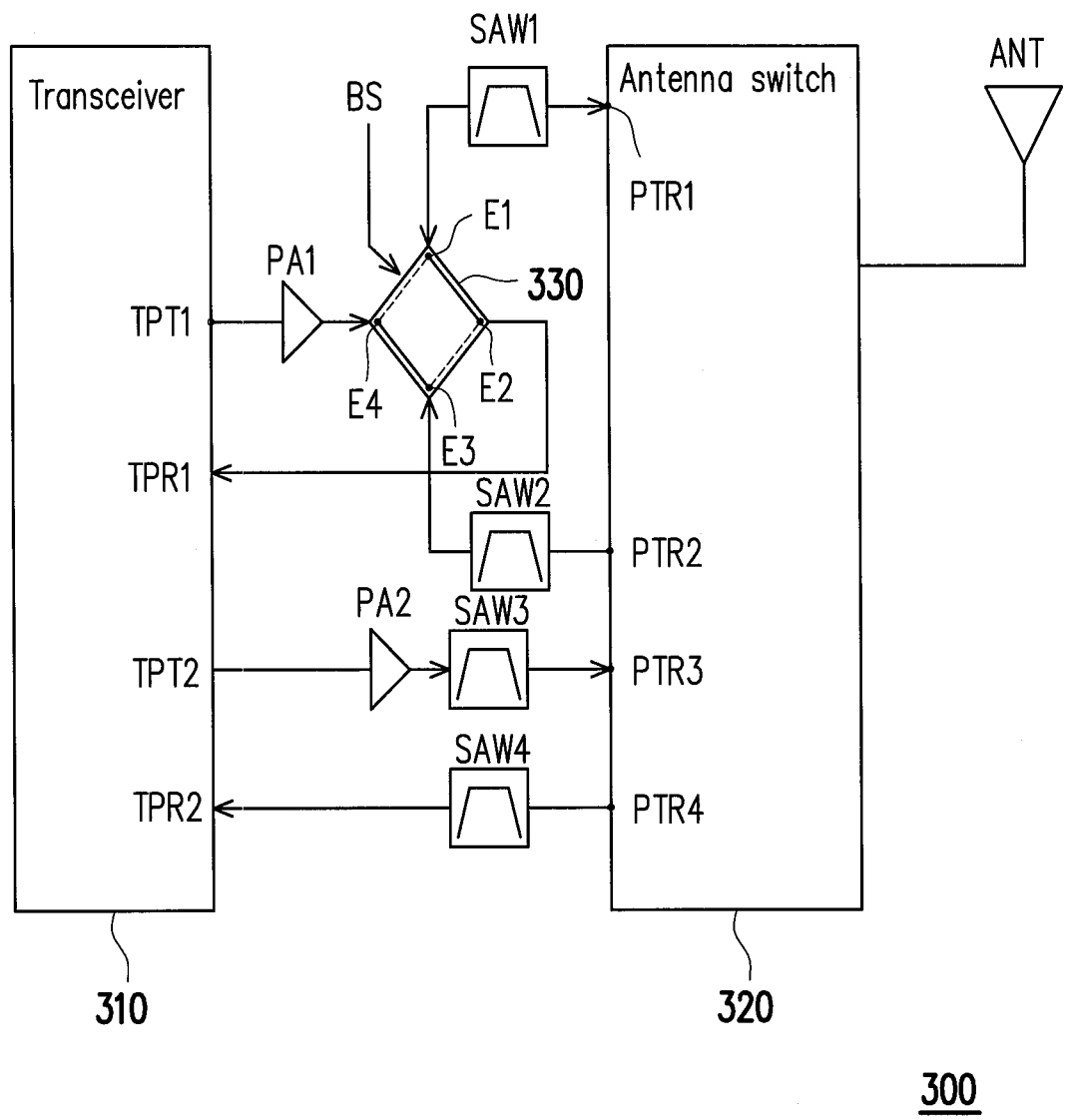
FIG. 3 is a block diagram of an electronic apparatus according to another embodiment of the present invention.

Please referring to FIG. 3, FIG. 3 is a block diagram of an electronic apparatus according to another embodiment of the present invention. The electronic apparatus 300 includes a transceiver 310, an antenna switch 320, an antenna ANT, switch unit 330, filters SAW1-SAW4, and power amplifiers PA1-PA2. The transceiver 310 has a plurality of transmitting ports TPT1-TPT2, and receiving ports TPR1-TPR2. The antenna switch 320 has a plurality transceiving ports PTR1-PTR4. The power amplifier PA1 is coupled between the transmitting port TPT1 of the transceiver 310 and the end E4 of the switch unit 330. The power amplifier PA1 receives a signal from the transmitting port TPT1 and amplifies the signal and transports the amplified signal to the end E4 of the switch unit 330. Moreover, the power amplifiers PA1 is coupled between the transmitting port TPT1 and the end E4 of the switch unit 330 and has a bandwidth covering both the first communication band and the second communication band.

Different from FIG. 2A, the transceiver 310 further has transmitting port TPT2 and receiving port TPR2. The antenna switch 320 further has transceiving ports PTR3-PTR4. The power amplifier PA2 is coupled between the transmitting port TPT2 and the filter SAW3, and the filter SAW3 is further coupled to the transceiving port PTR3. The filter SAW4 is coupled between the receiving port TPR2 and the transceiving port PTR4. For example, if the transceiving ports PTR1-PTR2 are used to receive and transmit the TD-SCDMA band signal and the TD-LTE band signal, the transceiving ports PTR3-PTR4 may be used to receive and transmit a frequency division (FD) band signal.

Figure 4:
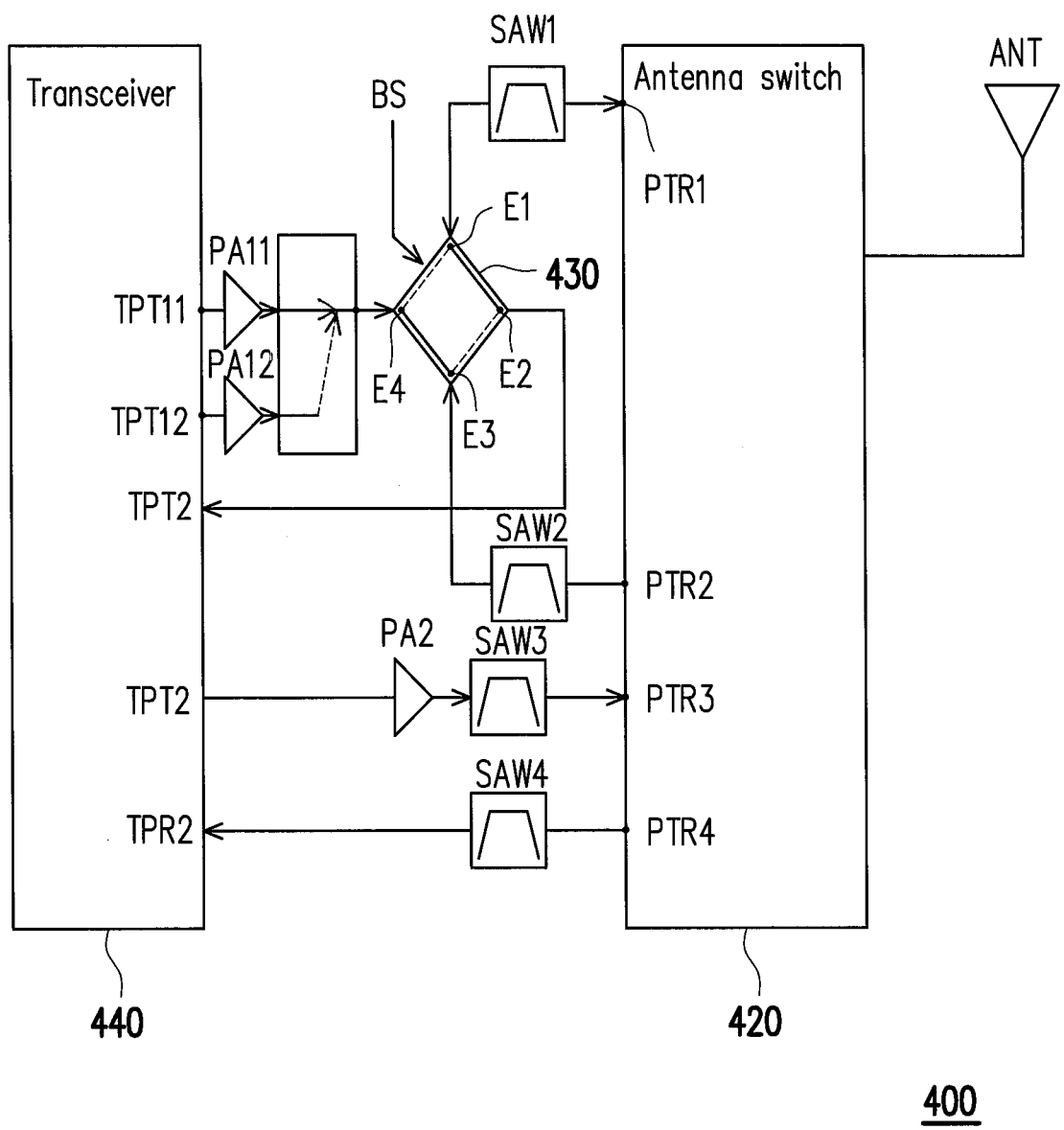
FIG. 4 is a block diagram of an electronic apparatus according to further another embodiment of the present invention.

Please referring to FIG. 4, FIG. 4 is a block diagram of an electronic apparatus according to further another embodiment of the present invention. The electronic apparatus 400 includes a transceiver 410, an antenna switch 420, an antenna ANT, switch unit 430, a selecting circuit 440, filters SAW1-SAW4, and power amplifiers PA11-PA12, and PA2. The transceiver 410 has a first sub-transmitting port TPT11 and a second sub-transmitting port TPT12, and transmitting port TPT2. The input ends of the power amplifiers PAH and PA12 are respectively coupled to the first sub-transmitting port TPT11 and the second sub-transmitting port TPT12. The output ends of the power amplifiers PA11 and PA12 are coupled to the selecting circuit 440. The selecting circuit 440 is further coupled to the end E2 of the switch unit 430, and the selecting circuit 440 selects one of the output of the power amplifiers PA11 and PA12 to couple to the end E2 of the switch unit 430.

Please notice here, in FIG. 4, a phase margin of the power amplifiers PA11 and a phase margin of the power amplifier PA12 may be different. That is, bands of the signals transmitted by the first sub-transmitting port TPT11 and the second sub-transmitting port TPT12 respectively are not limited. The band of the signal transmitted by the first sub-transmitting port TPT11 may different from the band of the signal transmitted by the second sub-transmitting port TPT12.

In summary, the disclosure provides at least one switch unit disposed between the transceiver and the antenna switch. Such as that, a number of the transmitting ports and receiving ports of the transceiver, a number of the transceiving ports of the antenna switch, and a number of the filters can be reduced. That is, a design difficulty of the electronic apparatus and the prime cost of the electronic apparatus can be reduced, too.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electronic apparatus, comprising:
   an antenna;
   an antenna switch, having N transceiving ports, the antenna switch being coupled to the antenna and selecting one of the transceiving ports for transceiving signal with the antenna;
   at least one switch unit, having a first end, a second end, a third end and a fourth end, the first end of the switch unit being coupled to a first transceiving port of the transceiving ports, and the third end of the switch unit being coupled to a second transceiving port of the transceiving ports;
   a transceiver, having M transmitting ports and M receiving ports, one of the transmitting ports being coupled to the fourth end of the switch unit, and one of the receiving ports being coupled to the second end of the switch unit, wherein, the first end is connected to the fourth end of the switch unit and the third end is connected to the second end of the switch unit when the antenna switch is in a first status, and the first end is connected to the second end of the switch unit and the third end is connected to the fourth end of the switch unit when the antenna switch is in a second status, and M and N are positive integers;

at least two modems, one of the at least two modems is configured to generate a selecting signal to switch the antenna switch into one of the first status and the second status;

at least one first filter, coupled between the first end of the switch unit and the first transceiving port; and at least one second filter, coupled between the third end of the switch unit and the second transceiving port.

2. The electronic apparatus according to claim 1, wherein the modem is operated in a first communication band when the antenna switch is in the first status and operated in a second communication band different from the first communication band when the antenna switch is in the second status.

3. The electronic apparatus according to claim 2, further comprising:

M power amplifiers, respectively coupled to the M transmitting ports for amplifying signals transmitted from the M transmitting ports;

wherein one of the M power amplifiers is coupled between one of the M transmitting ports and the fourth end of the switch unit and has a bandwidth covering both the first communication band and the second communication band.

4. The electronic apparatus according to claim 1, wherein the first communication band and the second communication band are not substantially different from each other.

5. The electronic apparatus according to claim 1, wherein the first filter has a first passing band covering the first communication band, the second filter has a second passing band covering the second communication band, and the first passing band and the second passing band are different.

6. The electronic apparatus according to claim 1, wherein the transmitting port which coupled to the second end of the switch unit comprises a first sub-transmitting port and a second sub-transmitting port, and the electronic apparatus further comprises:

a first power amplifier, an input end of the first power amplifier is coupled to the first sub-transmitting port;

a second power amplifier, an input end of the second power amplifier is coupled to the second sub-transmitting port; and a selecting circuit, coupled to output ends of the first power amplifier and the second power amplifier and the second end of the switch unit, for selecting one of the output ends of the first and second power amplifiers to couple to the second end of the switch unit.

7. The electronic apparatus according to claim 6, wherein a gain margin of the first power amplifier and a gain margin of the second power amplifier are different.

8. The electronic apparatus according to claim 1, wherein the M transmitting ports and the M receiving ports are respectively used to transmitting and receiving signals with time division band.

9. The electronic apparatus according to claim 1, wherein a part of the M transmitting ports and the M receiving ports are respectively used to transmitting and receiving time division synchronous code division multiple access (TD-SCDMA) signals, and another part of the M transmitting ports and the M receiving ports are respectively used to transmitting and receiving time division long term evolution (TD-LTE) signals.

10. The electronic apparatus according to claim 1, wherein the transceiver further comprises:

O transmitting ports and O receiving ports respectively transmit and receive signals with frequency division band, wherein, O is a positive integer.

* * * * *